United States Patent [19]

Terano

[11] Patent Number: 5,990,235
[45] Date of Patent: Nov. 23, 1999

[54] OLEFIN BLOCK COPOLYMER AND PRODUCTION PROCESS THEREOF

[75] Inventor: Minoru Terano, Ishikawa-ken, Japan

[73] Assignee: Research Development Corporation of Japan

[21] Appl. No.: 08/864,358

[22] Filed: May 28, 1997

Related U.S. Application Data

[63] Continuation of application No. 08/531,067, Sep. 20, 1995, abandoned.

[30] Foreign Application Priority Data

Sep. 22, 1994 [JP] Japan .................................. 6-228040

[51] Int. Cl.$^6$ ........................ C08F 297/08; C08L 23/16
[52] U.S. Cl. ........................ 525/53; 525/247; 525/268; 525/323; 526/348; 526/943
[58] Field of Search ..................... 525/247, 268, 525/323, 53; 526/348, 943

[56] References Cited

U.S. PATENT DOCUMENTS

| | | | |
|---|---|---|---|
| 3,499,060 | 3/1970 | Suzuki et al. | 525/268 |
| 3,798,288 | 3/1974 | McManimie et al. | 525/268 |
| 4,977,210 | 12/1990 | Kerth et al. | 525/323 |
| 5,391,629 | 2/1995 | Turner et al. | 525/323 |
| 5,733,980 | 3/1998 | Cozewithy et al. | 526/348 |
| 5,798,420 | 8/1998 | Cozewith et al. | 525/323 |

FOREIGN PATENT DOCUMENTS

| | | |
|---|---|---|
| 0405201 | 1/1991 | European Pat. Off. . |
| 0433986 | 6/1991 | European Pat. Off. . |
| 0433990 | 6/1991 | European Pat. Off. . |
| 4130429 | 3/1983 | Germany . |
| 2055388 | 3/1981 | United Kingdom . |
| 2184128 | 6/1987 | United Kingdom . |
| 9112285 | 8/1991 | WIPO . |

OTHER PUBLICATIONS

Y. Do et al. (1986) Macromol. 19, 2896–2900.

Amori et al. (1995). Macromol. Rapid Commun. 16, 247–252.

M. Bochmann, (1996) J Chem Soc, Dalton Trans. 255 (title page only).

J. Boor, Jr., Ziegler–Natta Catalysts and Polymerizations, Academic Press, New York, 1979, p. 32.

*Primary Examiner*—Donald R. Wilson
*Attorney, Agent, or Firm*—Sherman and Shalloway

[57] ABSTRACT

A chemically bonded olefin block copolymer consists essentially of chemically bonded polypropylene and poly (ethylene-co-propylene). The block copolymer is obtained by a process of (1) introducing a Ziegler polymerization catalyst based on titanium and propylene to a first polymerization zone (a) and polymerizing the propylene in the polymerization zone (a) for a period of 0.01 to 0.130 seconds and withdrawing an effluent stream of polypropylene, catalyst, solvent and unreacted propylene therefrom; (2) introducing the effluent stream to a second polymerization zone (b) together with ethylene dissolved in a solvent and carrying out a polymerization reaction in the second polymerization zone (b) for a period of 0.01 to 0.130 seconds; and (3) recovering the block copolymer.

8 Claims, 3 Drawing Sheets

[Fig 1]
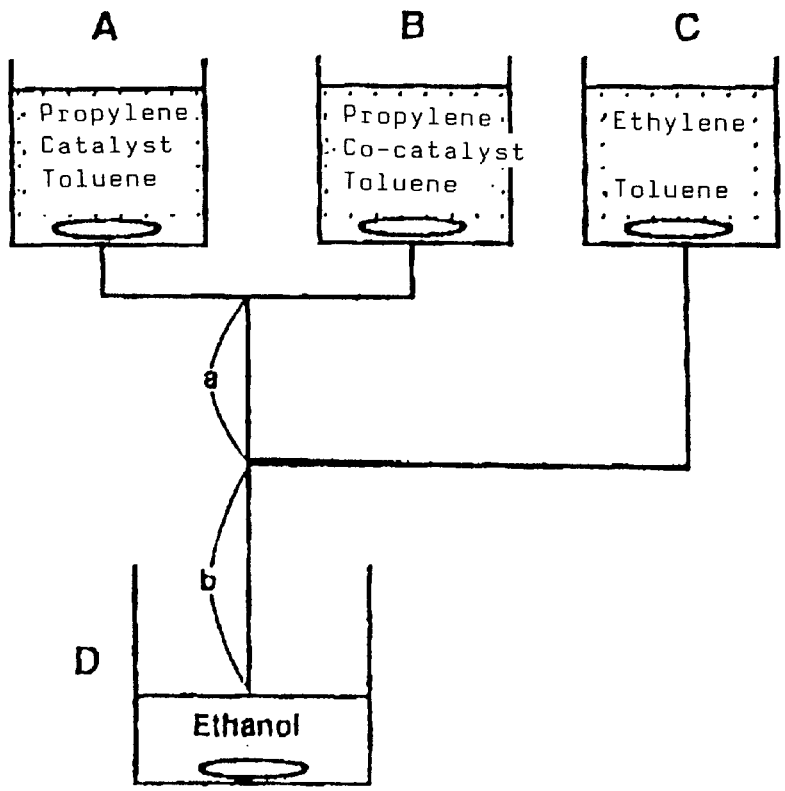
[Fig 4]
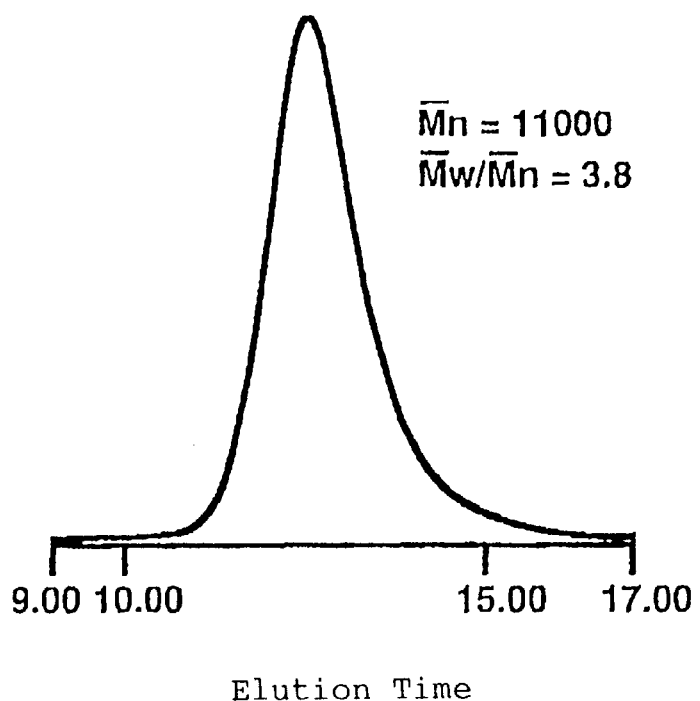
Elution Time

[Fig 2]
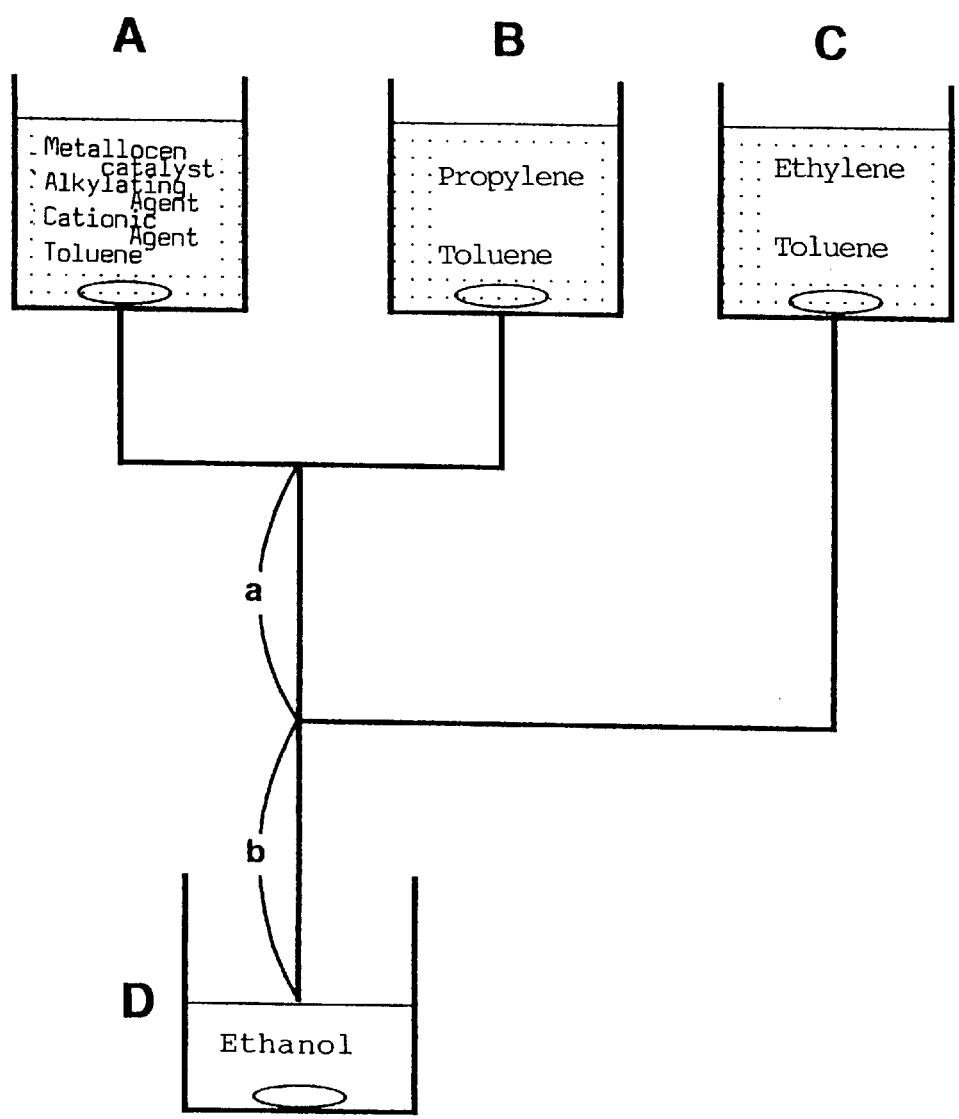

[Fig 3]
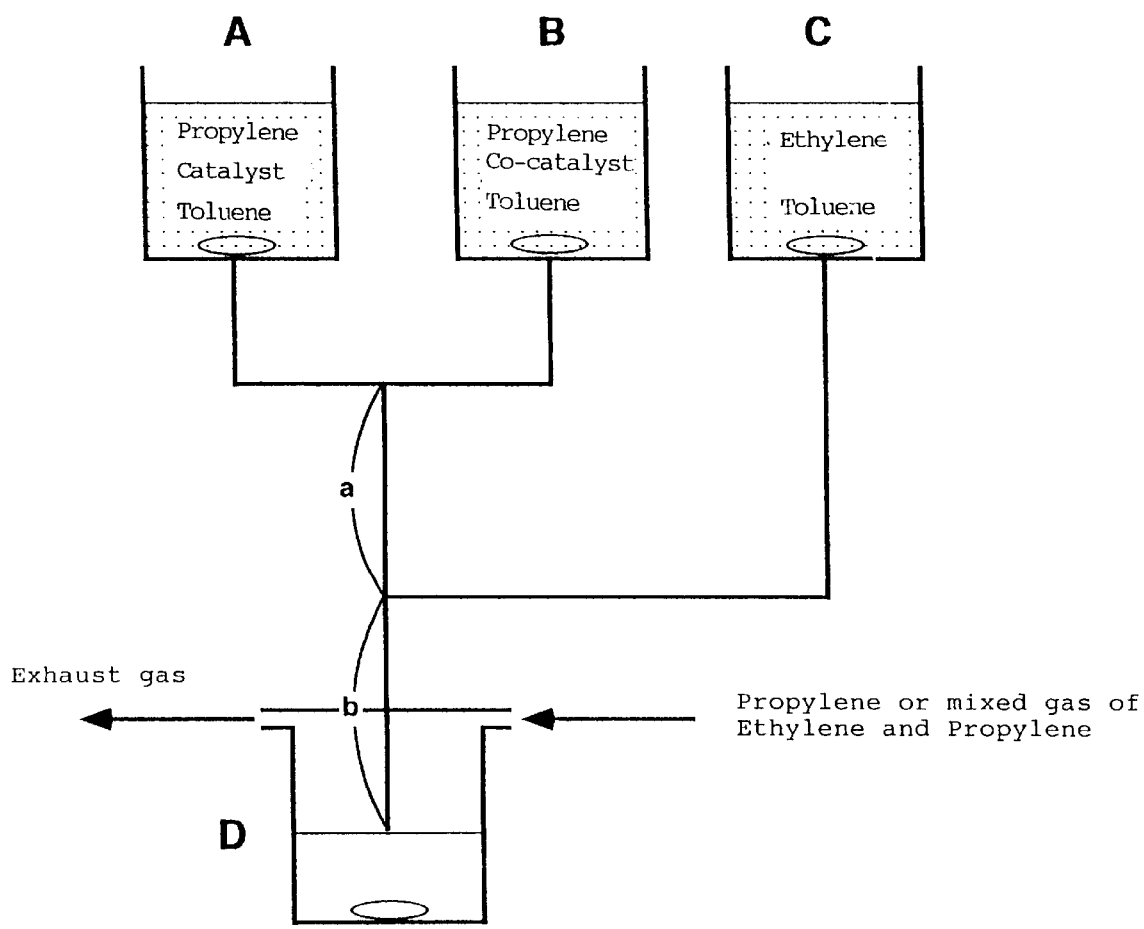

OLEFIN BLOCK COPOLYMER AND PRODUCTION PROCESS THEREOF

This application is a continuation of application Ser. No. 08/531,067, filed Sep. 20, 1995 now abandoned.

BACKGROUND OF THE INVENTION

1. Field of the Invention

The present invention relates to a polypropylene-b-poly (ethylene-co-propylene) or a polyethylene-b-poly(ethylene-co-propylene), and a production process thereof. More specifically, the invention relates to a polypropylene-b-poly (ethylene-co-propylene) or a polyethylene-b-poly (ethylene-co-propylene), that has a superior impact strength and is useful as a compatiblizer for a crystalline polyolefin and an amorphous polyolefin, and a production process of the block copolymer. Furthermore, the present invention relates to a polyolefin material, wherein a polymer in which a polypropylene or a polyethylene and poly(ethylene-co-propylene) are repeated and polypropylene-b-poly(ethylene-co-propylene) or a polyethylene-b-poly(ethylene-co-propylene) are blended in either a polyethylene or a poly(ethylene-co-propylene) or in their mixture.

2. Description of the Related Art

Polyolefins such as polypropylenes and polyethylenes are massively produceed and consumed since they are inexpensive and excellent in processability and various physical properties such as mechanical strength, heat resistance, chemical resistance and electrical insulation. However, for example, polypropylene is poor in impact strength while it is relatively excellent in stiffness; this disadvantage is improved by blending an amorphous poly(ethylene-co-propylene) that is excellent in impact strength. In the conventional block type copolymers, the matrix comprising polypropylene and the domain comprising poly(ethylene-co-propylene) are separated, which causes lowering the physical properties. These problems have been desired to be improved. It is expected that a block copolymer in which a polypropylene and a poly(ethylene-co-propylene) are chemically bonded might overcome these problems and provide a material having more excellent characteristics.

Conventionally, so-called block type copolymers have been known as one type of a polypropylenes that are composed of a polypropylene and poly(ethylene-co-propylene). The conventional block type copolymer is produced by a two-step process comprising, for example, the synthesis of a polypropylene for 30 minutes to several hours in a first polymerization vessel, followed by the synthesis of a poly(ethylene-co-propylene) for also 30 minutes to several hours in a second polymerization vessel. Considering the period of time for forming one polymer chain, chemical bonds between the polypropylene and the poly(ethylene-co-propylene) are not formed in so-called block type copolymers. They exist in a micro-blend state; a true block copolymer as defined in polymer chemistry is not formed, thus satisfactory characteristics as targeted have not always resulted.

SUMMARY OF THE INVENTION

In view of this problem, the present inventors have studied, in various respects, how to get a novel true block copolymer that is a true block copolymer having a polypropylene or a polyethylene chemically bonded with a poly (ethylene-co-propylene) and that has not been conventionally available. As a result, the present inventors have noted that a polymerization reaction of an olefin using a transition metal catalyst normally completes within one second for one polymer chain, and have found that a true block copolymer can be obtained by a polymerization in a short period using a special method. An object of the present invention is to provide true block copolymers and a polyolefine materials in which the true block copolymer exisit in blend with polyolefins, and to provide a process for producing them.

Essence of the present invention lies in an olefin block copolymer wherein a polypropylene or a polyethylene and a poly(ethylene-co-propylene) are chemically bonded; a polyolefin material characterized by that an olefin block copolymer wherein a polypropylene or a polyethylene and a poly(ethylene-co-propylene) are chemically bonded is present in blend with any one of a polypropylene, a polyethylene and a poly(ethylene-co-propylene) or in blend with their mixture; and providing a process for producing them.

BRIEF DESCRIPTION OF THE DRAWINGS

FIG. 1 is a schematic drawing explaining an example of polymerization process according to the present invention;

FIG. 2 is a schematic drawing explaining another example of polymerization process according to the present invention;

FIG. 3 is a schematic drawing explaining a production process of a polyolefin material according to the present invention; and FIG. 4 is a GPC curve for polypropylene-b-polyethylene-co-propylene obtained in Example 1.

DESCRIPTION OF THE PREFERRED EMBODIMENTS

Now, the present invention is explained in details. According to the present invention, a polyethylene-b-poly (ethylene-co-propylene) or a poly-propylene-b-poly (ethylene-co-propylene) is excellent in impact strength, and exhibits, in addition, useful characteristics as compatibilizer for a crystalline polyolefin and an amorphous polyolefin. In the case of a polypropylene, high isotacticity is preferred, however, it is not limited to such one. When the block copolymer according to the present invention is synthesized, a polypropylene, a polyethylene or a poly(ethylene-co-propylene) can be coexistent by controlling the polymerization process and condition.

In a process for producing such polymers, using a Ziegler catalyst such as titanium tetrachloride supported on magnesium chloride in combination with a cocatalyst such as triethylaluminum, or a metallocene compound of hafnium or zirconium in combination with methylaluminoxane or a boron compound, a polypropylene or polyethylene is synthesized at first within a small tube for 0.01 to 10 seconds and subsequently a poly(ethylene-co-propylene) is synthesized continuously in nearly same period of time. In the process, the length of the block chains may be varied by altering respective periods. Repeat of these steps twice or more is also possible; furthermore, the polymerization periods in the repeat step may be made longer period (1 minute to 2 hours approximately).

As for the catalyst, various catalysts can be used, other than the titanium tetrachloride supported on magnesium chloride mentioned above, including titanium trichloride catalysts, metallocene catalysts and other types. In addition, these catalysts may be preliminarily treated with an cocatalyst such as alkylaluminums, activating agents such as methylaluminoxan, and agents for making cationic such as a boron compound; so-called electron donor compounds such as an aromatic ester and silicon compounds may be coexistent.

As for the cocatalyst used in the present invention, various alkylaluminums, alkylaluminum halides, and alkylaluminum hydrides may be used. Examples of the alkylaluminum include trialkylaluminum such as triethylaluminum and triisobutylaluminum; examples of the alkylaluminum halide include diethylaluminum chloride and ethylaluminum sesquichloride; and examples of the alkylaluminum hydride include diethylaluminum hydride and diisobutylaluminum hydride.

The polymerization temperature is not limited in particular, however, normally in a range of 0° C. through 200° C.

The solvent used is not limited in particular, however, normally toluene, xylene, hexane or heptane is used.

EXAMPLES

Now, examples of the polymerization process according to the present invention are explained by referring to drawings. However, the present invention is not limited thereby.

FIG. 1 illustrates a polymerization process of an olefinic copolymer in which the polypropylene and poly(ethylene-co-propylene) are chemically bonded.

In FIG. 1, a toluene slurry of a catalyst is contained in vessel A, and a toluene solution of triethylaluminum is contained in vessel B; propylene is dissolved in both vessels. In vessel C, ethylene-saturated toluene is contained. Liquids in respective vessels flow out from Teflon tubes fitted to the down parts. At a first step, the effluents from vessels A and B are joined to synthesize a polypropylene. Symbol "a" indicates the polymerization region. The flow out of polymerization region "a" contains unreacted propylene and the catalyst in addition to the polypropylene; therewith the toluene solution of ethylene from vessel C joins, and a poly(ethylene-co-propylene) is produced in polymerization region "b" at end of the polypropylene. Subsequently, the flow is introduced into vessel D that contains ethanol, and the catalyst is deactivated. Thereby, a polypropylene-b-poly(ethylene-co-propylene) results. Composition of the product polymer can be controlled by adjusting the length of polymerization regions "a" and "b" and the amount of propylene in vessels A and B and of ethylene in vessel C.

FIG. 2 is almost the same as FIG. 1; a metallocene catalyst, an alkylating agent, and an agent for making cation are solved in vessel A, propylene-saturated toluene is contained in vessel B. and ethylene-saturated toluene is contained in vessel C. Liquids in respective vessels flow out from Teflon tubes fitted to the down parts. The reactions in polymerization region "a" and "b" are same as in FIG. 1; a desired block copolymer was obtained in the same way as in FIG. 1.

In FIG. 3 similarly to FIG. 1, a toluene slurry of a catalyst is contained in vessel A, and a toluene solution of an cocatalyst is contained in vessel B; propylene is dissolved in both vessels. In vessel C, toluene in which ethylene is dissolved is contained. After getting a polypropylene-b-poly(ethylene-co-propylene) silmilarly to the case of FIG. 1, propylene, ethylene, or a mixed gas of propylene and ethylene are, individually or successively if required, introduced into vessel D to polymerize. Thereby, these monomers polymerize to produce a polyolefin material. Thus, the polyolefin material was obtained in which the polypropylene-b-poly(ethylene-co-propylene) polymerized preliminarily was mixed with a polypropylene and/or a polyethylene and/or a poly(ethylene-co-propylene).

EXAMPLES 1 THROUGH 3 AND COMPARATIVE EXAMPLE

A polypropylene-b-poly(ethylene-co-propylene) is prepared by using the apparatus of FIG. 1.

One hundred milliliters of a toluene slurry containing 1.3 g of a catalyst is accommodated in vessel A, in which propylene was solved to be 0.68 mol/l. The catalyst used was prepared as follows.

Magnesium chloride and ethyl benzoate were coground in a vibrating mill for 30 hours, then treated with titanium tetrachloride at 90° C. for 2 hours; thereafter, the product was washed with heptane which was finally replaced with toluene.

In vessel B, 100 ml of toluene solution of 70 mmol/l triethylaluminum was charged and propylene was solved to 0.68 mol/l. In vessel C, 100 ml of toluene solution of 0.21 mol/l ethylene content was accommodated.

Table 1 shows the time of polymerization in reaction regions "a" and "b", and the number average molecular weight and molecular weight distribution of the resultant polymers. The number average molecular weight and molecular weight distribution were determined by GPC. The values were estimated to polystyrene standards.

TABLE 1

Synthesis of polypropylene-b-poly(ethylene-co-propylene)

| Example | Polymerization Time (second) region "a" | region "b" | $\overline{Mn}$ × 103 | $\overline{Mw}/\overline{Mn}$ | Ethylene content mol % |
|---|---|---|---|---|---|
| 1 | 0.065 | 0.065 | 11 | 3.8 | |
| 2 | 0.060 | 0.120 | 15 | 3.6 | 25 |
| 3 | 0.130 | 0.130 | 20 | 3.3 | |

The GPC curve for resultant polypropylene-b-poly(ethylene-co-propylene) is given in FIG. 4.

Next, the polypropylene-b-poly(ethylene-co-propylene) prepared in Example 2 and separately prepared 0.19 g of a polypropylene (polymerization period: 0.08 seconds) blended with 0.38 g of a poly(ethylene-co-propylene) (polymerization period: 0.13 seconds) (this blend is referred to as Comparative Example) were respectively charged into flasks, to each of which 50 ml of n-heptane was added. Stirring was applied under nitrogen atmosphere at room temperature (about 25° C.) for 24 hours. Thereafter, each was subjected to centrifugal separation (3000 rpm, for 8 minutes), and supernatant was removed. This sequence of operations was repeated three times, then the extraction residues were dried at 60° C. under vacuum for 2 hours; yields of the resultant polymers were measured. Table 2 shows the results.

TABLE 2

Results of n-heptane extraction experiments

| Sample | Weight before extraction (g) | Weight after extraction (g) |
|---|---|---|
| Example 2 | 0.57 | 0.52 |
| Comparative Example | 0.57 | 0.19 |

The sample from Example 2 retained most polymer, whereas the Comparative Example sample retained only polypropylene and the poly(ethylene-co-propylene) was extracted.

EXAMPLE 4

A polypropylene-b-poly(ethylene-co-propylene) was prepared by using the apparatus of FIG. 2.

In vessel A, 100 ml of toluene solution was charged which contained a polymerization catalyst consisting of 0.26 g of dimethylsilylene bis(2,3,5-trimethylcyclopentadienyl) zirconium dichloride, 18 mmol of triisobutyl aluminum, and 0.66 mmol of N,N-dimethylanilinium tetra (pentafluorophenyl)borate, and the content was maintained for 2 minutes at 30° C. with agitation. Propylene in vessel B and ethylene in vessel C were respectively dissolved in 100 ml of toluene under a pressure of 8 kgf/cm$^2$G. Thereafter, propylene in "a", and ethylene and propylene in "b" were respectively polymerized at 30° C. for 0.5 seconds; 1.33 g of a polymer was obtained thereby.

EXAMPLE 5

A Polyolefin material containing a polypropylene-b-poly (ethylene-co-propylene) was prepared by using the apparatus of FIG. 3.

In vessel A one hundred milliliters of a toluene slurry containing 1 g of the same catalyst as used in Example 1 was charged, and propylene was solved to be 0.68 mol/l.

In vessel B, a toluene solution containing 14 mmol of triethylaluminum and 0.7 mmol of cyclohexyl methyl dimethoxysilane was pressured by propylene to be 0.68 mol/l also. In vessel C, ethylene was dissolved into 100 ml of toluene to be 0.21 mol/l. As the first step, propylene was polymerized in polymerization region "a" at a temperature of 30° C. for 0.1 seconds, and the synthesis of poly(ethylene-co-propylene) bonded with the propylene was made in "b" for 0.1 seconds. Then in vessel D, polypropylene was synthesized at 80° C. for 10 minutes followed by poly (ethylene-co-propylene) for 15 minutes. Thereby, 42.6 g of an polyolefin material that contained 0.37 g of polypropylene-b-poly(ethylene-co-propylene) was obtained.

As explained hereinabove, the synthesis of a polyolefin block copolymer that has been impossible by conventional polymerization processes and technologies was successful according to the present invention. The characteristic of the novel block copolymer was different from the conventional block type copolymers due to the chemical bond of a polypropylene or a polyethylene with a poly(ethylene-co-propylene). The polymer is very useful as a new plastic and a compatibilizer for a crystalline polyolefin and an amorphous polyolefin.

What is claimed is:

1. A chemically bonded olefin block copolymer consisting essentially of chemically bonded polypropylene and poly (ethylene-co-propylene), which block copolymer is obtained by a process which comprises
   (1) introducing a Ziegler polymerization catalyst comprising titanium compound and aluminum alkyl compound and propylene dissolved in a solvent to a first polymerization region (a) and polymerizing the propylene in said polymerization region (a) for a period of 0.01 to 0.130 seconds, withdrawing an effluent stream comprising polypropylene, said catalyst, solvent and unreacted propylene, and
   (2) introducing said effluent stream to a second polymerization region (b) together with ethylene dissolved in a solvent and carrying out a polymerization reaction in said second polymerization region (b) for a period of 0.01 to 0.130 seconds, and
   (3) recovering chemically bonded polypropylene-b-poly (ethylene-co-propylene).

2. An olefin block copolymer consisting essentially of polypropylene chemically bonded to poly(ethylene-co-propylene), which block copolymer is obtained by a continuous liquid phase process which consists essentially of
   (1) introducing a Ziegler polymerization catalyst consisting essentially of titanium compound and aluminum alkyl compound and propylene dissolved in a solvent to a first polymerization region (a) and polymerizing the propylene in said polymerization region (a) for a period of 0.01 to 0.130 seconds, withdrawing an effluent stream comprising polypropylene, catalyst, solvent and unreacted propylene, and
   (2) introducing said effluent stream to a second polymerization region (b) together with ethylene dissolved in a solvent and carrying out a polymerization reaction in said second polymerization region (b) for a period of 0.01 to 0.130 seconds, and
   (3) recovering chemically bonded polypropylene-b-poly (ethylene-co-propylene).

3. The chemically bonded polypropylene-b-poly (ethylene-co-propylene) according to claim 2 wherein the block copolymer is obtained by carrying out the polymerization reaction in polymerization region (a) for 0.06 to 0.130 second and carrying out the polymerization reaction in polymerization region (b) for 0.065 to 0.130 second.

4. An olefin block copolymer consisting essentially of polypropylene chemically bonded to poly(ethylene-co-propylene), which block copolymer is obtained by a continuous liquid phase process which consists essentially of
   (1) introducing a Ziegler polymerization catalyst consisting essentially of titanium halide compound supported on magnesium halide compound and aluminum alkyl compound and propylene dissolved in a solvent to a first polymerization region (a) and polymerizing the propylene in said polymerization region (a) for a period of 0.06 to 0.130 second, withdrawing an effluent stream comprising polypropylene, catalyst, solvent and unreacted propylene, and
   (2) introducing said effluent stream to a second polymerization region (b) together with ethylene dissolved in a solvent and carrying out a polymerization reaction in said second polymerization region (b) for a period of 0.065 to 0.130 second, and
   (3) recovering chemically bonded polypropylene-b-poly (ethylene-co-propylene).

5. A process for producing an olefin block copolymer essentially consisting of chemically bonded polypropylene and poly(ethylene-co-propylene) and, which comprises
   (1) introducing a Ziegler polymerization catalyst comprising titanium halide compound and aluminum alkyl compound and propylene dissolved in a solvent to a first polymerization region (a) and polymerizing the propylene in said polymerization region (a) for a period of 0.01 to 0.130 seconds, withdrawing an effluent stream comprising polypropylene, said catalyst, solvent and unreacted propylene, and
   (2) introducing said effluent stream to a second polymerization region (b) together with ethylene dissolved in a solvent and carrying out a polymerization reaction in said second polymerization region (b) for a period of 0.01 to 0.130 seconds, and
   (3) recovering chemically bonded polypropylene-b-poly (ethylene-co-propylene).

6. A process for producing an olefin block copolymer comprising polypropylene chemically bonded to poly (ethylene-co-propylene), by a continuous liquid phase process which consists essentially of
   (1) introducing a Ziegler polymerization catalyst consisting essentially of titanium halide compound supported on magnesium halide compound and aluminum alkyl compound and propylene dissolved in a solvent to a first polymerization region (a) and polymerizing the propylene in said polymerization region (a) for a period of 0.01 to 0.130 second, withdrawing an effluent stream comprising polypropylene, catalyst, solvent and unreacted propylene, and (2) introducing said effluent stream to a second polymerization region (b) together with ethylene dissolved in a solvent and carrying out a polymerization reaction in said second polymerization region (b) for a period of 0.01 to 0.130 second, and (3) recovering chemically bonded polypropylene-b-poly(ethylene-co-propylene).

7. A process for producing a chemically bonded polypropylene-b-poly(ethylene-co-propylene) according to claim 6 which includes carrying out the polymerization reaction in polymerization region (a) for 0.06 to 0.130 second and carrying out the polymerization reaction in polymerization region (b) for 0.065 to 0.13 second.

8. A process for producing a chemically bonded olefin block copolymer according to claim 7 wherein the chemically bonded olefin block copolymer produced consists essentially of polypropylene-b-poly(ethylene-co-propylene).

* * * * *